(12) United States Patent
Cheng

(10) Patent No.: US 6,292,604 B1
(45) Date of Patent: Sep. 18, 2001

(54) OPTICAL COUPLER ARRANGEMENT

(75) Inventor: Yihao Cheng, Kanata (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/357,123

(22) Filed: Jul. 16, 1999

(51) Int. Cl.$^7$ ............................................. G02B 6/28
(52) U.S. Cl. ......................... 385/24; 385/31; 385/33; 385/34; 359/127; 359/131
(58) Field of Search .................. 385/24, 15, 31, 385/33, 34, 35, 47; 359/115, 124, 127, 131

(56) References Cited

U.S. PATENT DOCUMENTS

| | | | |
|---|---|---|---|
| 4,213,677 | * 7/1980 | Sugimoto et al. | 350/96.18 |
| 5,642,447 | * 6/1997 | Pan et al. | 385/31 |
| 5,642,448 | * 6/1997 | Pan et al. | 385/31 |
| 5,652,814 | * 7/1997 | Pan et al. | 385/24 |
| 5,845,023 | * 12/1998 | Lee | 385/33 |
| 5,917,626 | * 6/1999 | Lee | 359/131 |

\* cited by examiner

*Primary Examiner*—Rodney Bovernick
*Assistant Examiner*—Sung Pak
(74) *Attorney, Agent, or Firm*—Neil Teitelbaum

(57) ABSTRACT

An optical coupling arrangement for use in an optical filter is disclosed wherein optical fibre are disposed only along one line in one orientation across an end face of an optical fibre tube having a slanted end face. By disposing slanted/polished optical fibre end faces along a line that is orthogonal to a longitudinal axis of the optical fibre tube, optimum coupling of light is achieved.

11 Claims, 4 Drawing Sheets

OPTICAL COUPLER ARRANGEMENT

FIELD OF THE INVENTION

This invention relates generally to the coupling of light from an optical waveguide end, to one or more other optical waveguides via an at least partially reflective optical element.

BACKGROUND OF THE INVENTION

It is common practice to couple light from an optical waveguide such as an optical fibre to one or more optical fibres via an at least partially transmissive, partially reflective optical element. For example a dichroic filter is often disposed between a pair of collimating/focusing lenses such as graded index (GRIN) lenses to provide a wavelength division multiplexing (WDM) function. FIG. 1 illustrates a prior art WDM filter, wherein wavelengths of light λ1 and λ2 are launched into a first port at an end face of a GRIN lens 12a and wherein light of wavelength λ1 is reflected from a filter 14 which passes light of wavelength λ2. The lines indicating the path of the beam as it is partially reflected and partially transmitted through the filter represents a ray through the centre of the beam launched into the lens 12a. FIGS. 2 and 3 illustrate the beam's shape and path for light launched into a port along the optical axis of the lens and for light launched into a port offset from the optical axis respectively.

Prior art FIG. 4 illustrates a typical arrangement of one side of a WDM filter wherein an optical fibre tube 8 holding two optical fibres at predetermined locations is shown optically coupled with an adjacent GRIN lens 12c which is juxtaposed to a filter 14. Fibre tubes or sleeves of this type provide a convenient way of holding two or more optical fibres a fixed distance apart such that the pair of fibres can then be moved without damaging them. Furthermore, the tube allows the fiber ends (and tube) to be polished such that the end face is slanted to lessen the effects of unwanted back reflections.

Heretofore, there has been no known reason to align pairs of optical fibres at the slanted, polished end face of the sleeve in any special orientation except with regard to pairs of optical fibres being offset a same distance from the optical axis. The term pair relates to two optical fibres which via some reflective element are optically coupled to one another.

Prior art FIG. 13 illustrates pairs of optical fibres (A,B), (C,D), and (E,F) disposed at a slanted end face of a fibre tube 8. By placing a reflective element at an appropriate location and position, and by providing an appropriate collimating/focusing lens, light from one of each of the pairs will couple into the other of the pair in an expected fashion.

What is unexpected, is that if the fibres are located at any locations other than along one particular line through the optical axis, coupling will be negatively affected. For example the positioning of the pair of optical fibres shown in FIG. 5 is least favourable for optimum coupling in a WDM filter. This is illustrated in more detail in FIG. 6, where the path AC and the path CB are of different lengths illustrated by ΔL due to the position of the fibres 13a and 13b on the slanted end face of the sleeve 8.

FIG. 7 more clearly illustrates the problem with haphazardly disposing the fibre equidistant from the longitudinal axis of the sleeve or more importantly from a line extending from the optical axis of the lens 12d wherein a beam leaving the output fibre at point A is perfectly collimated at the reflective surface 16 through point C, and wherein the reflection from 16 is focused at point D along the dashed line 18, instead of being focused at point B coincident with the optical fibre end.

It is an object of this invention to provide an arrangement of optical fibres within a tube or sleeve that will couple light in an optimum manner.

It is a further object of this invention to provide an optical system wherein a preferred coupling is achieved with essentially no additional components from previous similar coupling methods.

SUMMARY OF THE INVENTION

In accordance with the invention, there is provided, a WDM filter comprising:

a first optical fibre tube having two or more optical fibres contained therein;

a second optical fibre tube having at least one optical fibre contained therein, the second optical fibre tube being optically aligned with one of the two or more optical fibres contained in the first optical fibre tube; an inwardly facing end face of the first fibre tube being slanted so as to reduce the effects of back reflections, the slanted end face having a slant of less than 15 degrees and greater than 2 degrees from a line orthogonal to a longitudinal axis of the optical fibre tube;

collimating/focusing lenses disposed between the first and second optical fibre tubes, the collimating lens having an optical axis;

an at least partially reflective optical filter disposed between the collimating/focusing lenses;

end faces of the two or more optical fibres being disposed along a line at the end face of the slanted tube at locations equidistant from the longitudinal axis of the lens and at locations such that light launched from one of the at least two optical fibre end faces is collimated at a collimating location at or near the optical filter and such that collimated light at the collimating location is focused at another of the at least two optical fibre end faces.

In accordance with the invention, there is provided, an optical filter comprising:

a wavelength dependent at least partially reflective optical filter;

an optical fibre tube having two optical fibres contained therein, a cross-section of the optical fibre tube through longitudinal axis thereof delineating an end face disposed toward the at least partially reflective optical filter that is slanted with respect to a line normal to the longitudinal axis of the optical fibre tube, the slant angle being between 2 and 10 degrees, wherein end faces of the at least two optical fibres lie on a line across the end face of the tube being a shortest line across the slanted end face of the tube through the longitudinal axis.

In accordance with the invention, there is further provided, a WDM filter comprising:

first and second back-to-back collimating/focusing lenses each having an optical axis;

a filter element disposed between the back-to-back lenses, a sleeve having a longitudinal axis that is parallel with the optical axis of the first lens, the sleeve being adjacent the first lens and having two optical fibres contained therein, end faces of the fibres and the sleeve being cut and or polished to slant to lessen the unwanted effects of back reflections;

the slanted end faces of the fibres lying on a line that is substantially perpendicular to the longitudinal axis of the sleeve.

In accordance with the invention, there is yet further provided, an optical filter comprising:

an optical fibre tube having two or more optical fibres contained therein, an inwardly facing end face of the first fibre tube being slanted so as to reduce the effects of back reflections, the slanted end face having a slant of less than 15 degrees and greater than 2 degrees from a line orthogonal to a longitudinal axis of the optical fibre tube;

a collimating/focusing lens disposed adjacent an end of the optical fibre tube, the collimating/focusing lens having an optical axis;

an at least partially reflective optical element disposed adjacent the collimating/focusing lens, end faces of the two or more optical fibres being disposed along a line at the end face of the slanted tube at locations equidistant from the longitudinal axis of the lens and at locations such that light launched from one of two or more optical fibre end faces is collimated at a collimating location at or near the optical filter and such that collimated light at the collimating location is focused at another of the at least two optical fibre end faces.

BRIEF DESCRIPTION OF THE DRAWINGS

Exemplary embodiments of the invention will now be described in conjunction with the drawings in which.

DETAILED DESCRIPTION

Figure 1:
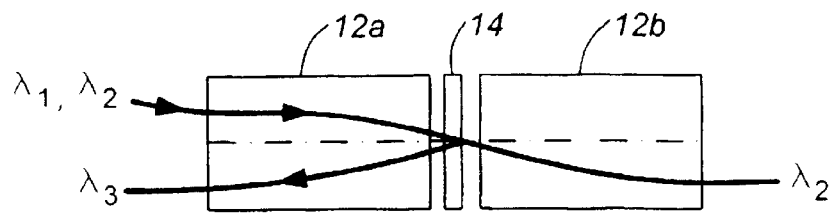
FIG. 1 is a side view of a prior art WDM optical filter for separating or combining two wavelengths of light.
Figure 2:
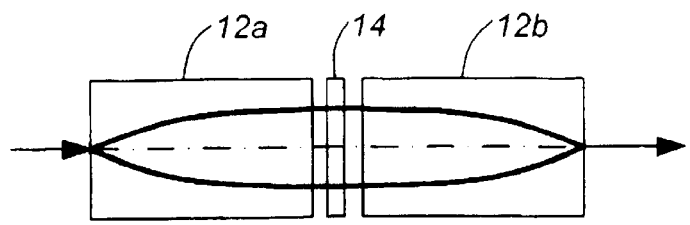
FIG. 2 is a side view of the prior art WDM optical filter shown in FIG. 1.
Figure 3:
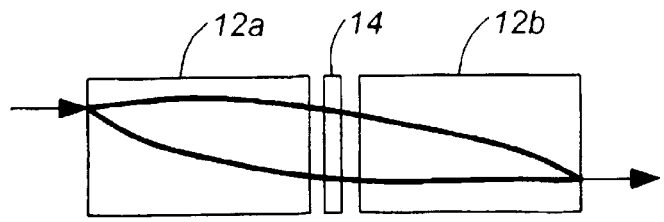
FIG. 3 is a side view of the prior art WDM optical filter shown with 2 ports.
Figure 4:
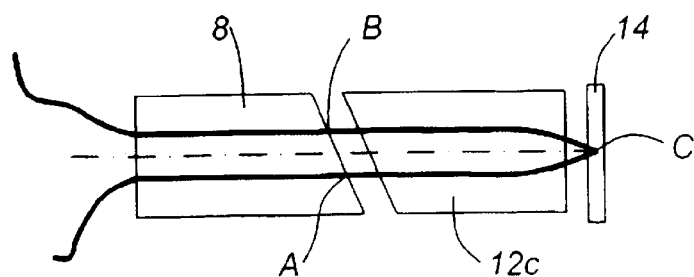
FIG. 4 is a side view of an optical filter wherein the optical fibre sleeve and adjacent GRIN lens have complementary reciprocal slanted end faces for lessening the effect of back reflections.
Figure 5:
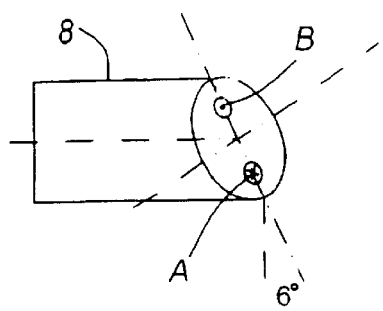
FIG. 5 is an isometric view of a prior art optical fibre tube illustrating the slanted end face.

The following description, it should be understood that same elements shown in different figures are assigned same reference numerals. Referring now to FIG. 1, a 0.25 pitch GRIN lens 12a is shown having an input beam represented by an line with a directional arrow at an input end face 12. Fiber lenses of this type are produced under the trade name "SELFOC"; the mark is registered in Japan and owned by the Nippon Sheet and Glass Co. Ltd. At an end face of the quarter pitch GRIN lens the input beam becomes collimated. Another matched quarter pitch GRIN lenses 12b is disposed in a back to back relationship with the lens 12a. Each GRIN lens is provided with a port which is a point or region along an end face of the lens for receiving or transmitting a beam of light. A dichroic filter 14 is disposed between the two GRIN lenses and is shown to filter light of wavelength $\lambda 1$, by reflecting it backwards to a second port on the end face of the GRIN lens 12a. Light of wavelength $\lambda 2$ is passed through the filter to an output port on the outwardly facing end face of the lens 12b. Improvements to this well know filter arrangement have been made over the years. FIG. 4 illustrates an improvement wherein a fibre tube is present for securely holding the two optical fibres therein in a fixed relationship; furthermore, the mutually facing end faces of the fibre tube 8 and GRIN lens 12c have complementary slanted end faces, with a polished slant of approximately 6° to lessen the effects of unwanted back reflections. FIG. 5 is another view of the end face of the fibre tube 8 illustrating the relative position of the end faces of optical fibres contained within the sleeve 8, at positions A and B, with respect to the slanted end face.

Figure 6:
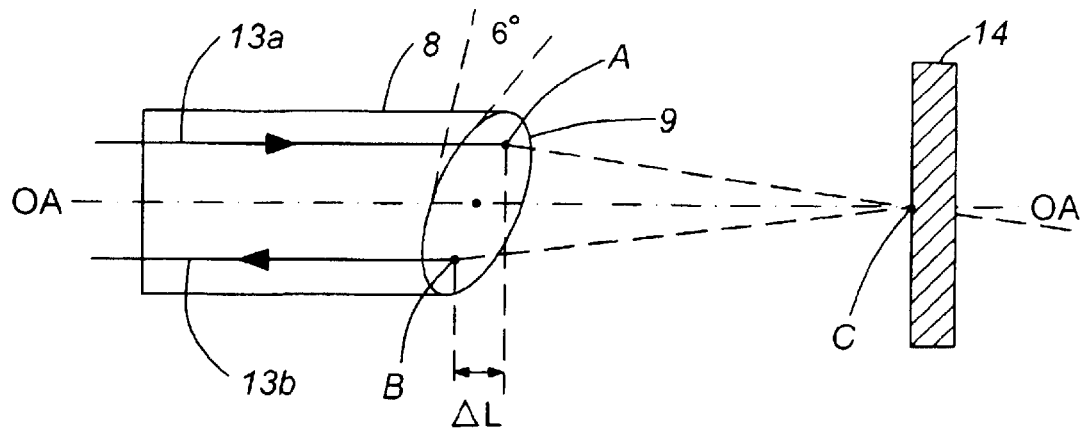
FIG. 6 is an isometric view of the tube shown in FIG. 5 including an optical filter disposed a distance away.
Figure 7:
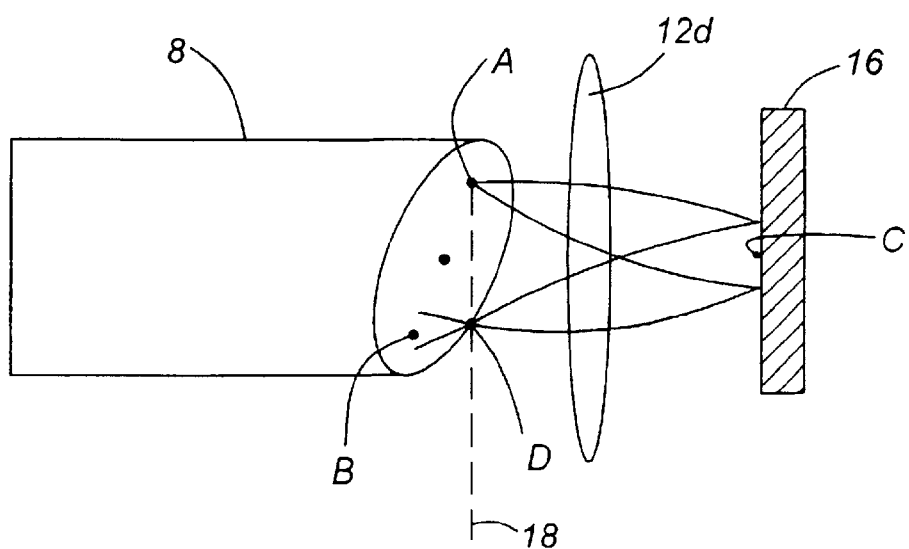
FIG. 7 is a view of the tube shown in FIGS. 5 and 6 illustrating a focal point being a distance away from the end face of a receiving optical fibre.

Turning now to FIG. 6, another drawing shows the locations A and B of the fibre ends at the slanted end face of the fibre tube 8, and shows an optical filter 14 a distance away. For clarity, the lens is not shown in this figure, however would be required to provide a collimated beam at the filter 14 end face. What is noticeable in FIG. 6, is that the distance from location A to location C is not equal to the distance from location C to location B. FIG. 7 illustrates inherent problem with this prior art design, shown in FIGS. 5, 6, and 7. Since the distance AC in not equal to AB when light is launched from location A to the filter at location C, it becomes collimated at the filter. However collimated light reflected from the filter becomes focused at a location D, short of the location B. Hence at location after location D, the beam begins to diverge and is not focused at the end face of the optical fibre at location B. This phenomenon is subtle, as was discovered when monitoring and analyzing the light received using the prior art circuit shown which was not being efficiently coupled into the receiving optical fibre.

Figure 8:
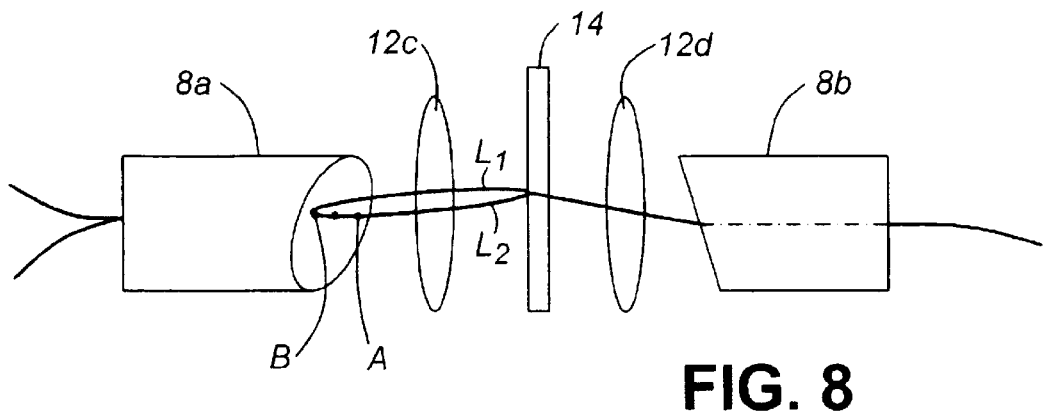
FIG. 8 is an isometric view of an optical filter system in accordance with the invention, where the drawbacks of the circuit of FIG. 7 have been obviated by disposing the end faces of the optical fibres along a particular line along the slanted end face of the optical fibre tube.
Figure 9:
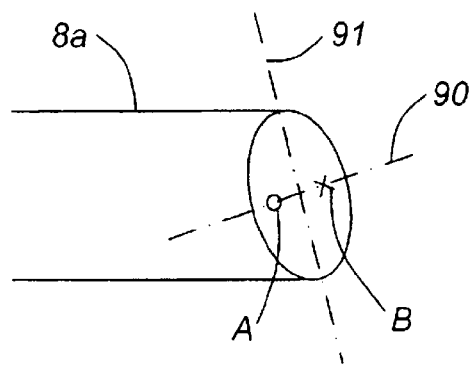
FIG. 9 is a detailed illustration of the end face of the optical fibre tube shown in FIG. 8.
Figure 10:
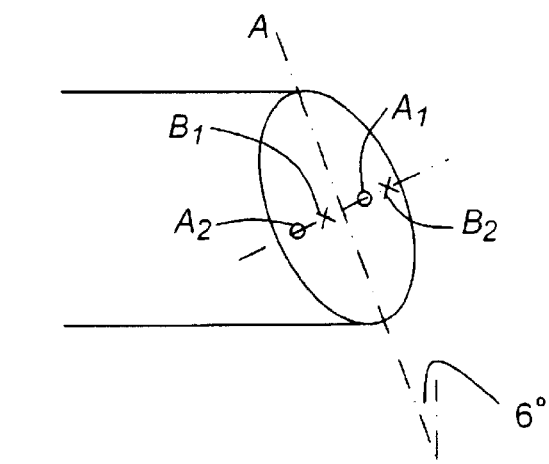
FIG. 10 is a detailed illustration of an end face of an optical fibre tube in accordance with the invention wherein four optical fibre are shown disposed at locations along a line which forms a shortest diameter across the slanted end face of the optical fibre tube.
Figure 11:
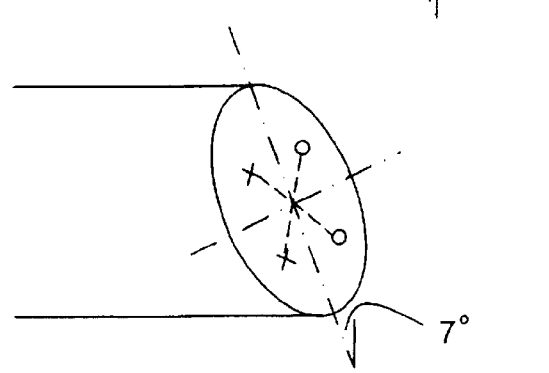
FIG. 11 is a prior art sleeve having pairs of optical fibres disposed locations on opposite sides of the longitudinal axis.
Figure 12:
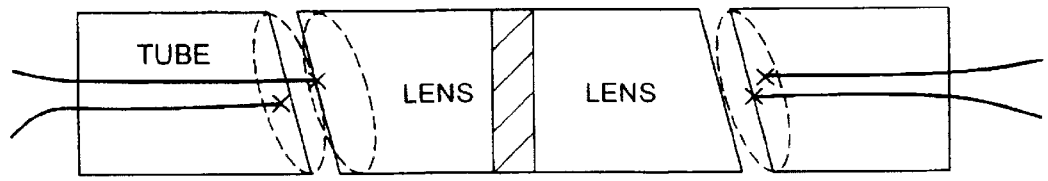
FIG. 12 is a side view of an optical filter system in accordance with the invention.
Figure 13:
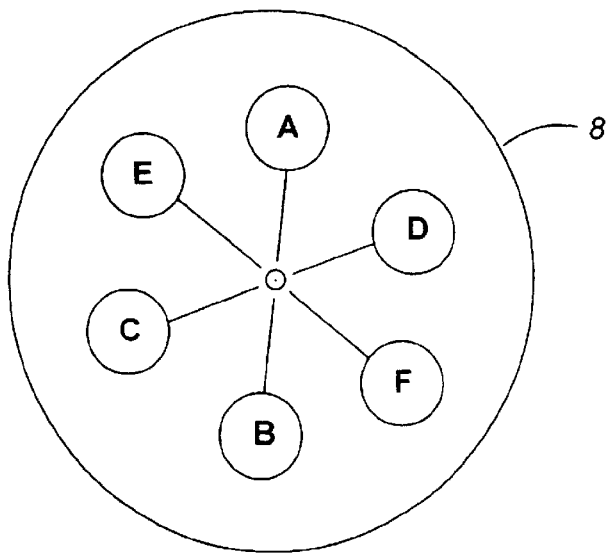
FIG. 13 is an end view of a prior art optical fibre sleeve wherein fibres are disposed around the longitudinal axis of the sleeve; and, FIG. 14 is a view of the sleeve and lens arrangement in accordance with this invention.

FIG. 8 illustrates a preferred embodiment of the invention, wherein optical fibre ends at locations A and B oriented 90 degrees offset from the orientation shown in FIGS. 5, 6, and 7 provide locations equidistant from the filter 14. It should understood that optical fibre tubes, or sleeves are customarily round in cross-section, however tubes that are square, triangular, rectangular, or other polygonal shapes can be envisaged and are within the scope of this invention. However, when fibre sleeve having a round cross-section is polished at an end, for example at an angle of 6 degrees, the end face becomes spherical, and the diameter of the end face is larger if taken along its longest axis 91 and is shorter across its shorter axis 90 orthogonal to the longer axis shown in FIG. 9. FIG. 10 is an alternative embodiment of the invention wherein four optical fibre ends are shown at locations A1, B1 and A2, B2; once again, the fibre end faces are at locations that define a line across the slanted face such that light launched from A1 directed to B1 is collimated at a distant filter after passing through a collimating lens (not shown in this figure) and is focused at the receiving fibre end at B1. In contrast, prior art FIG. 11, and FIG. 13 define fibre locations at a slanted end face of the tube that suffer from the aforementioned focusing or collimating problems of prior art FIG. 7. For example, light could be launched between optical fibres at locations A and B, C and D, and/or E and F. FIG. 12 illustrates an entire filtering system in accordance with this invention.

Figure 14:
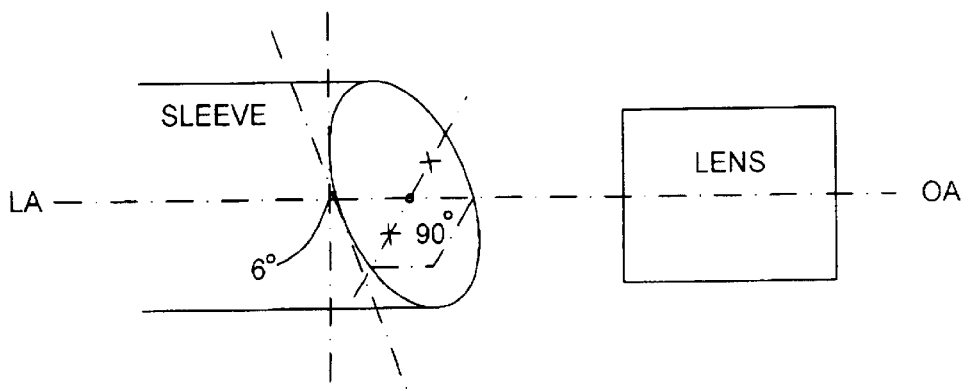

Referring now to FIG. 14, a sleeve having its end face polished at 6 degrees from the normal to the longitudinal axis (LA) of the sleeve is shown, wherein the fibre end faces denoted by x are also polished with a same slant. The line shown through the two ends x—x is orthogonal to the LA of the sleeve and OA of the lens. Hence, the fibre end faces are slanted and lie on a line that is orthogonal to the OA of the lens or LA of the sleeve. This novel arrangement provides preferred coupling of light from and into the fibre end faces. Of course numerous other embodiments may be envisaged without departing from the spirit and scope of the invention.

What is claimed is:

1. A WDM filter comprising:
a first optical fibre tube having two or more optical fibres securely held therein in a predetermined relationship;
a second optical fibre tube having at least one optical fibre contained therein, the second optical fibre tube being optically aligned with one of the two or more optical fibres contained in the first optical fibre tube; an inwardly facing end face of the first fibre tube being slanted so as to reduce the effects of back reflections, the slanted end face having a slant of less than 15 degrees and greater than 2 degrees from a line orthogonal to a longitudinal axis of the optical fibre tube;
collimating/focusing lenses disposed between the first and second optical fibre tubes, the collimating lens having an optical axis;
an at least partially reflective optical filter disposed between the collimating/focusing lenses;
end faces of the two or more optical fibres being fixed along a line at the end face of the slanted tube at locations equidistant from the longitudinal axis of the lens and at locations such that light launched from one of the at least two optical fibre end faces is collimated at a collimating location at or near the optical filter and such that collimated light at the collimating location is focused at another of the at least two optical fibre end faces, the line being substantially perpendicular to the longitudinal axis of the optical axis tube.

2. A WDM filter as defined in claim 1, wherein a distance from the end faces of the two optical fibres to the collimating location is the same.

3. A WDM filter as defined in claim 2 wherein the collimating location is at the at least partially reflective filter.

4. An optical filter comprising:
a wavelength dependent at least partially reflective optical filter;
an optical fibre tube having two optical fibres securely held therein in a predetermined relationship, a cross-section of the optical fibre tube through a longitudinal axis thereof delineating an end face disposed toward the at least partially reflective optical filter that is slanted with respect to a line normal to the longitudinal axis of the optical fibre tube, the slant angle being between 2 and 10 degrees, wherein end faces of the at least two optical fibres lie on a line across the end face of the tube being a shortest line across the slanted end face of the tube through the longitudinal axis.

5. A WDM filter comprising:
first and second back-to-back collimating/focusing lenses each having an optical axis;
a filter element disposed between the back-to-back lenses,
a sleeve having a longitudinal axis that is parallel with the optical axis of the first lens, the sleeve being adjacent the first lens and having two optical fibres securely held in a fixed relationship therein, end faces of the fibres and the sleeve being cut and or polished to slant to lessen the unwanted effects of back reflections;
the slanted end faces of the fibres being fixed on a line that is substantially perpendicular to the longitudinal axis of the sleeve.

6. A WDM filter as defined in claim 5, comprising a second sleeve having a longitudinal axis that is parallel with the optical axis of the second lens.

7. A WDM filter as defined in claim 6, wherein one of the fibre ends within the first sleeve is optically coupled to both of the other optical fibre ends.

8. A WDM filter as defined in claim 6, wherein optical fibre end faces lie only along the line perpendicular to the longitudinal axis of the sleeve.

9. A WDM filter as defined in claim 8, wherein a plurality of other optical fibres are contained within the sleeve other than the two optical fibres, said plurality of other optical fibres having their end faces slanted and lying along the line perpendicular to the longitudinal axis of the sleeve.

10. An optical filter comprising:
an optical fibre tube for securely holding two or more optical fibres therein in a fixed relationship, an inwardly facing end face of the optical fibre tube being slanted so as to reduce the effects of back reflections, the slanted end face having a slant of less than 15 degrees and greater than 2 degrees from a line orthogonal to a longitudinal axis of the optical fibre tube;
a collimating/focusing lens disposed adjacent the slanted end of the optical fibre tube, the collimating/focusing lens having an optical axis;
an at least partially reflective optical element disposed adjacent the collimating/focusing lens, end faces of the two or more optical fibres being disposed along a line on the slanted end face at locations equidistant from the longitudinal axis of the optical fibre tube and at locations such that light launched from one of two or more optical fibre end faces is collimated at a collimating location at or near the optical filter and such that collimated light at the collimating location is focused at another of the two or more optical fibre end faces, the line on the slanted end face being substantially perpendicular to the longitudinal axis of the optical fibre tube.

11. An optical filter as defined in claim 10, wherein the two or more optical fibres comprise at least four optical fibres.

* * * * *